United States Patent
Aharpour

(10) Patent No.: US 11,455,877 B2
(45) Date of Patent: Sep. 27, 2022

(54) SYSTEM AND METHOD OF REDUCING ENERGY CONSUMPTION OF DATALOGGER DEVICES WHILE MAINTAINING HIGH SAMPLING RATE AND REAL TIME ALARM FUNCTION

(71) Applicant: Arash Aharpour, Vancouver (CA)

(72) Inventor: Arash Aharpour, Vancouver (CA)

( * ) Notice: Subject to any disclaimer, the term of this patent is extended or adjusted under 35 U.S.C. 154(b) by 0 days.

(21) Appl. No.: 17/182,456

(22) Filed: Feb. 23, 2021

(65) Prior Publication Data
US 2022/0270467 A1     Aug. 25, 2022

(51) Int. Cl.
G08B 21/18   (2006.01)
G08B 1/08    (2006.01)
G08B 29/06   (2006.01)
G08B 29/04   (2006.01)

(52) U.S. Cl.
CPC .......... G08B 21/185 (2013.01); G08B 1/08 (2013.01); G08B 29/04 (2013.01); G08B 29/06 (2013.01)

(58) Field of Classification Search
CPC ............. G06F 11/0781; G06F 11/0709; G06F 11/0769; H04L 63/1416; G08B 25/10; G08B 25/016
See application file for complete search history.

(56) References Cited

U.S. PATENT DOCUMENTS

| | | | | |
|---|---|---|---|---|
| 2007/0050777 A1* | 3/2007 | Hutchinson | ......... | G06F 11/0781 718/104 |
| 2010/0295684 A1* | 11/2010 | Hsieh | ..................... | A61B 5/002 600/595 |
| 2016/0373910 A1* | 12/2016 | Moss | ..................... | G06F 9/453 |
| 2017/0193807 A1* | 7/2017 | Samara | ................. | H04W 4/023 |

* cited by examiner

*Primary Examiner* — Mirza F Alam

(57) ABSTRACT

A system for reducing energy consumption of datalogger devices while maintaining high sampling rate and real time alarm function is provided. The system comprises a datalogger device, an algorithm stored in the datalogger device, and an application stored in the datalogger device that when executed implements a regular high sampling interval and extended server update interval for non-emergency situations and based on detection of an alarm, implements an emergency state. Based on the implementation, the application sends an immediate alert to the server, maintains the high sampling rate, shortens update interval in accordance with at least algorithm processing of inputs, continues updating on the shortened interval based at least on continued algorithm processing, determines, based on at least one change in alarm activity, to exit the emergency state, and returns to the extended update interval.

20 Claims, 3 Drawing Sheets

SYSTEM AND METHOD OF REDUCING ENERGY CONSUMPTION OF DATALOGGER DEVICES WHILE MAINTAINING HIGH SAMPLING RATE AND REAL TIME ALARM FUNCTION

FIELD OF THE INVENTION

The present disclosure is in the field of datalogger devices. More particularly, the present disclosure teaches systems and methods of adjusting sampling intervals of datalogger activity and adjusting intervals between updates (including pushing alarms) of such activity transmitted to servers and other oversight devices to manage energy consumption of datalogger devices while maintaining vigilant oversight of monitored datalogger activity.

BACKGROUND

Datalogger devices measure activity and retrieve data from another measurement or data acquisition device over time in adjustable intervals. Typically, the basic operation of dataloggers is based on a cycle of sleep and wake ups for collecting a sample data in adjustable intervals. Dataloggers may then provide information about sampling to external devices such as servers in several manners.

Many datalogger devices are powered by batteries such that the limited duration provided by batteries can be an ongoing problem.

There are several basic categories of data loggers based on how data is retrieved from memory and transmitted to other devices.

1) Stand-alone data loggers with no internet connection: A user would need to manually retrieve the data actively by connecting to data logger via a wired connection such as USB or RS232 or via wireless connection such as Bluetooth or direct Wi-Fi. These types of data loggers cannot push an alarm to the user if any deviation from pre-defined thresholds of measured parameters is detected unless the user maintains the connection to the datalogger device.

2) Standalone dataloggers with internet connection. These data loggers can push notifications to external devices via application executing on the datalogger. Limitation of memory, one client to one device access limitation and necessity of available active internet connection in both client and device side are significant limitations of these types of devices which leads to short battery life.

3) Cloud-based dataloggers: Record and upload the readouts to a web-based application. These types of data loggers are capable of pushing alarms to the user if a deviation from predefined threshold of measured parameter is detected. The alarm threshold may be set in the online application. The data logger is reporting the samples to the online application in pre-set intervals. It is the online application which makes determinations to push notifications to users if a deviation is detected.

Cloud-based datalogging procedures of data sampling are faster and demand less energy compared to synchronizing the collected data with the internet. If power source is limited such as with battery-powered datalogger devices which is common, sampling rate is reduced to prolong battery life, and alarms are not discovered during the sleep time between two samples. Maximum alarm delay can be equal to sampling interval.

DETAILED DESCRIPTION

Figure 1:
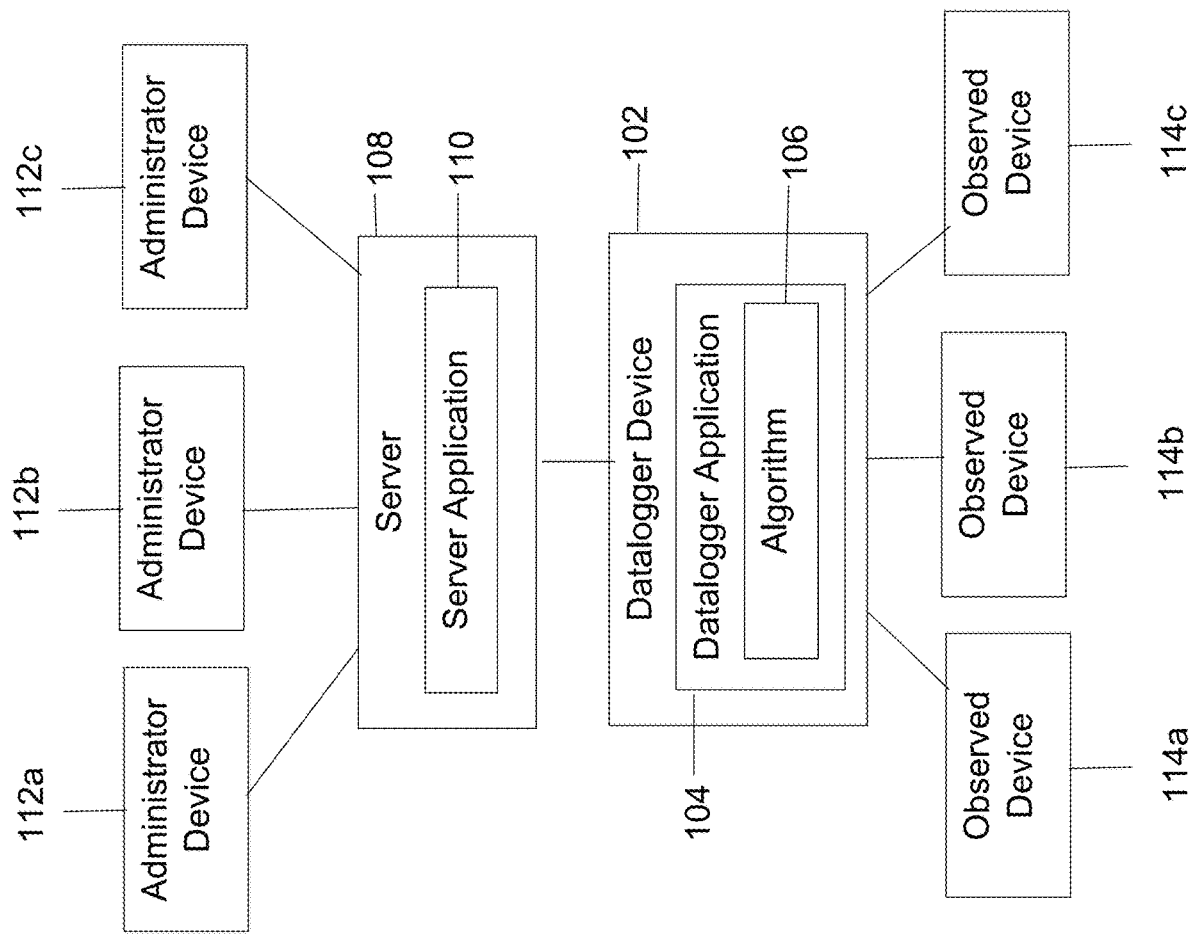
FIG. 1 is a block diagram of a system of reducing energy consumption of datalogger devices while maintaining high sampling rate and real time alarm function according to an embodiment of the present disclosure.

Systems and methods described herein provide an application and algorithm that execute on a datalogger device to observe and measure alarm conditions and transmit updates and alarm information to a server. With objectives of at least preserving datalogger battery life, observation sampling is configured to take place relatively more frequently than in previous implementations. Transmission updates however are configured to occur much less frequently than previously. Because sampling uses less battery power than transmission of updates, configuring for frequent sampling but less frequent updates conserves battery capacity while maintaining safe levels of observed systems comparable or superior to systems that update more frequently and consume more battery capacity. The present disclosure is directed to syncing alarm criteria with the datalogger and letting the datalogger decide to shorten the syncing interval in alarm condition and back to normal. In this context, the main most important parameters that should be synced between the server and data logger are Reading interval, Syncing interval, and Min/Max Alarm thresholds.

The application executing on the datalogger is configured, with results from algorithm processing, to alter the update interval should an alarm condition be observed. Based detection of observed alarms, the application may shorten the update interval such that a server or other recipient of updates receives updates far more frequently than during non-alarm times. The shortened update interval may continue until underlying causes of alarms are addressed and the problem is cleared or until an authorized party overrides the shortened update interval.

The system synchronizes as soon as measurements are out of defined bounds by the user. The system reduces the syncing interval as long as the alarm state is present. The system synchronizes one last time as soon as it is back within the range and goes back to normal cycles. System will retry syncing if it fails to sync successfully for any reason. The retry procedure may consist of two cycles. It retries X times in row to connect to the server if it fails to connect for a single reading which is detected to be out of range. If it fails, the system assumes some temporary interruption in connectivity might cause the problem that might be solved in a short while. It will retry again by next sampling time and will retry Y times before giving up about that certain designated upload or alarm upload time and wait for next designated upload time or T minutes in alarm conditions.

To shorten delays associated with pushing alarms, the datalogger application needs to shorten the uploading intervals. The datalogger application can remain sampling every minute and uploading every 24 hours provides (3500×24 hours)=9.6 years of battery life with maximum of 59 seconds alarm detection delay. This is merely an example as 9.6 Years is a calculation based on a certain sensor, certain type of Wi-Fi module and certain type of battery. It is not a general calculation and is not applicable to every sensor. (3500 times uploading is the batteries estimated capacity in the above example. If the battery capacity is enough for 3500 times connecting to server, uploading every minute will exhaust the battery in 3500 hours~145 days but the same battery is good for 3500 days if device upload once a day)

Users need to access their logs faster while alarm conditions are present. If a restaurant owner receives an alarm from the restaurant's refrigerator while the restaurant is closed, the owner wants to check if it was just a glitch or if he/she must get to the location to fix the issue. During the subject time, he/she needs more frequent updates.

But when everything is running normally, the restaurant owner does not need to check the temperature every hour. He/she just needs the temperature records once a year for health inspection. Therefore, during normal periods, there is no difference if the datalogger device uploads every minute or every week as long as the restaurant owner is certain the alarm will not be delayed. This is only an example for one the usages of one type of datalogger which is temperature logger. But principle could be applied to any other logger for example of measured pressure, Co2, or light intensity.

Systems and methods introduce an "Emergency state" that is implemented as soon as an alarm is detected. In "Emergency state" the datalogger device will shorten the upload interval (by default to every 60 minutes but it could be any interval, for example 15 minutes or 1 minute). Therefore, during an alarm updates will occur far more frequently than normal periods. The present disclosure provides for implementing short upload intervals only if there is an alarm and for returning to upload intervals when the "Emergency state" is cleared. Once cleared, a final upload takes place to provide assurance that the Emergency state has been cleared.

The application feeds inputs including data and commands to the algorithm which makes determinations about changing the update interval. The inputs include data about the nature and frequency of alarms received by the datalogger. Further, policy stipulations based at least on business rules and technical directives may constitute inputs to the algorithm or may otherwise bear on how and when the algorithm is used and when the algorithm may be used in conjunction with other tools.

The application, including algorithm, work closely with at least one server that receives updates from the application. While the application makes observations and may control the algorithm unilaterally, the server may also transmit instructions and configuration changes to the application. Some of the instructions and changes from the server may involve inputs to be made to the algorithm. Instructions may in some cases override decisions made by the application and may override recommendations and results generated by the algorithm. The server may be the primary component to send messages to an administrator after alarm information is received from the application on the datalogger device.

Based on rules and policy information stored at least on the server, the server may determine when an administrator should be notified. The administrator may communicate directly with the application on the data logger or via the server to provide instructions and configuration information. As noted, some commands and data received by the datalogger application from the administrator directly or via the server may include inputs to be fed by the application to the algorithm.

The application and the algorithm may also receive instructions and other inputs from devices other than the server or an administrator device. Entries to the application and to the algorithm may be regulated by permission levels granted to the administrator and other authorized parties and devices.

The system may use various communication technologies to transmit updates from the datalogger to the server. For example, Wi-Fi, LTE, LTE-M, 4G, 5G, or even local area network may be used.

The system also includes an icon or other selectable object or control called "Sync now" that wakes up the system and triggers the cycle of the algorithm manually. Unlike some other systems, in LTE-M, there is a possibility of checking for possible incoming SMS (text message) commands with a very low amount of energy called eDRX (Extended Discontinuous Reception). The "Upload" command can be sent to the device (and will be executed in a short amount of time). It is similar to activating the "Sync now" object remotely on demand. This feature may be of value when it comes to GPS tracking on battery for usages with no access to power. It may provide about ten times longer standby time to GPS trackers compared to other implementations. This embodiment may be applicable primarily only when LTE-M is the technology in use.

Turning to the figures, FIG. 1 depicts components and interactions of a system 100 of reducing energy consumption of datalogger devices while maintaining high sampling rate and real time alarm function. The system 100 comprises a datalogger device 102, a datalogger application 104, an algorithm 106, a server 108, and a server application 110.

The system 100 also comprises administrator devices 112a, 112b, 112c and observed devices 114a, 114b, 114c. The datalogger application 104 may be referred to hereinafter for brevity as the application 104. The datalogger device 102 may be referred to hereinafter for brevity as the datalogger 102. While quantity three each of administrator devices 112a, 112b, 112c and observed devices 114a, 114b, 114c are depicted in FIG. 1 and provided by the system 100, in embodiments more than or less than quantity three each of such components may be provided. Administrator devices 112a-c may for example be smartphones or laptop computers. Observed devices 114a-c may for example be refrigeration equipment wherein temperature is observed.

The datalogger device 102 is an electronic device that records data over time or in relation to location either with a built-in instrument or sensor or via external instruments and sensors. Datalogger devices 102 are generally small, battery powered, portable, and equipped with a microprocessor, internal memory for data storage, and sensors. Some datalogger devices 102 interact with a personal computer and use software to activate the datalogger devices 102 and view and analyze the collected data. Other datalogger devices 102, have a local interface device such as a keypad or LCD and may be used as a standalone device. Cloud-based dataloggers use Wifi, 3G, LTE, LTE-M, 5G to upload the data to a server through the internet. Access to data is possible through the internet and a website (web-based application) or client application. Data could be retrieved and settings could be changed through any internet enabled device like a phone or a computer through the web-based or client application. Users may access a site, login and see their own data. The user can login on any device from anywhere and any time and access needed data.

The datalogger application 104 executes at least partially on the datalogger device 102 and periodically polls or samples an observed device 114a-c for alarm conditions. Sampling interval as provided herein is a time interval between drawing samples. In an embodiment, the application 104 may conduct sampling at an interval of once per minute, such that the maximum delay or time lag for an alarm condition on an observed device 114a-c to be detected is 59 seconds in the embodiment. The interval is adjustable and could be as short as a few milliseconds or several hours, depending on user settings. The application 104 transmits updates the server 108 at an update interval which may be shortened slightly or considerably by the application 104 based on observed alarm conditions.

Systems provided herein do not just look for alarms but rather record the data anyway if it is an alarm or not. Many users just need the data and never set an alarm. Systems provided herein are a combination of an alarm and a datalogger. Some monitoring devices provided by other implementations only check for alarm conditions and notify the user but don't do the data logging.

The algorithm 106 may be a full or partial component of the application 104 or may be an entirely separate software module that resides partially or fully on the datalogger device 102. The algorithm 106 receives many inputs described below and generates recommendations regarding changing sampling interval and changing update interval. Based on various characteristics of alarms that may become inputs to the algorithm 106, the algorithm 106 recommends various changes. Over the course of an emergency, the algorithm 106 may be relied upon several times to make recommendations as information about alarms is received.

The server 108 may be physically remote from the datalogger device 102. The server 108 receives updates from the application 104. During non-alarm periods, the updates may be advised that no alarms were observed. When a particular metric is continuously observed, the updates may report discrete metrics or report a range of metrics observed during the period. In embodiments, the server 108 comprises more than one physical computer that may be located in multiple physical locations. The server 108 may be cloud-based with its processing and storage needs provided for by multiple physical devices.

An important point is that communication between server and datalogger is through the internet so range does not matter. In older devices server/mini server used to have a wired or wireless receiver and received data directly from the datalogger and the range was limited. In systems provided herein, the user can log in and change the settings like alarm thresholds or sampling and syncing intervals in the server from anywhere in the world. The server synchronizes the new settings with the datalogger no matter where in the world the datalogger is. What is unique with the present disclosure is syncing not only sampling and uploading intervals, but also syncing the alarm levels so datalogger can decide to shorten the upload interval locally.

The server application 110 executes on the server 108 and handles server-side processing of instructions and data. The server application 110 may be web-based. The server application 110 processes updates received from the datalogger application 104. The server application 110 makes determinations as to whether and when an administrator should be notified of an alarm condition. The server application 110 receives instructions from administrators using administrator devices 112a-c and may transmit instructions or other information to the datalogger application 104.

Observed devices 114a-c are devices, machines, or equipment whose output or condition is observed by datalogger devices 102 and measured and reported by the application 104. Observed devices 114a-c may include unattended weather station recording equipment that measures wind speed and direction, temperature, relative humidity, and solar radiation. Observed devices 114a-c may include unattended hydrographic recording equipment that measures water level, water depth, water flow, water pH, and water conductivity. Observed devices 114a-c may include equipment for measuring temperature of pharmaceutical products, medicines and vaccines during storage and may include equipment for measuring temperature and humidity of perishable products while refrigerated.

Sensors, thermometers, gauges, and other measurement devices and equipment may be attached to or otherwise integrated with the observed devices 114a-c. The measurement devices and equipment may feed periodically gathered data to datalogger devices 102. The application 104 in turn polls or samples such data gathered by the datalogger devices 102 at sampling rates determined by the application 104 through use of the algorithm 106 and via other means.

The datalogger devices 102 receive the data from the observed devices 114a-c. The data itself may comprise alarms. Alternatively, or additionally, the datalogger devices 102 after analysis may create alarms that the application 104 receives during its sampling.

Inputs to the algorithm 106 include upload interval, reading interval, alarm thresholds (Min/Max allowed), and time. Inputs also include the number of retry limit, alarm repeat interval, and erase memory margin. Descriptions of key inputs are as follows.

Reading (Recording) interval: The interval of measurements, for example every minute. The recording interval could be defined as a certain amount of time or one or more designated points of time in the future which might be unique or recurring. Datalogger devices 102 will measure a parameter such as temperature using a sensor or read the values from another measurement device, for example a thermometer. Recording interval is the parameter which defines the maximum alarm delay and the number of records per hour. An authorized user can set or change the Reading (recording) interval.

Uploading (Syncing) interval: The datalogger device 102 will upload records to the server 108 in the cloud or elsewhere with this interval. The uploading interval could be defined as a certain amount of time or one or more designated points of time in the future which might be unique or recurring. Upload intervals can be equal or likely much longer than recording intervals, for example 24 hours. In these intervals the datalogger device 102 will upload records with their time stamp. Syncing intervals may have no effect on sampling rate and alarm delay. The user can change or set the uploading (syncing) interval.

Minimum & Maximum alarm limit: Alarm threshold for any measured parameter. Administrator devices 112a-c may be notified if any measurement is out of defined bounds. If no alarm threshold is defined the application 104 may not push any notification and may just continue recording and syncing the data with the server 108. A single datalogger device 102 may collect more than one type of data so there may be multiple sets of min/max alarm limits.

Variables may be categorized as follows:
1) Variables that may be entered by an administrative device 112a-c.
   Reading (recording interval)
   Upload (syncing) interval
   Minimum and maximum alarm threshold for each sensor
2) Variables that may be defined or adjusted in the application 104 as default or other values, on the server 108 automatically, or by an authorized user of an administrative device 112*a-c* through the server 108 or directly to the application 104. These variables comprise at least:

Erase memory margin. Memory has limitations in the number of times it may be erased and reused. To manage the wearing rate of internal memory, the system can decide not to erase records in the internal memory even if they are synced with the server 108 if a certain level of memory's capacity is not used yet to minimize the number of erasing cycles.

Alarm repeat interval. The system may reduce the interval of syncing data with the internet (and remind the user if necessary) if measured parameters are out of bounds. When conditions return to normal, the interval may be restored to the ordinary life cycle to reduce the energy consumption. The shortened upload (syncing) interval that may be used during the alarm may be named "Alarm repeat interval." A similar principle may be applied to recording intervals.

Retry limit. While attempting to establish a connection to the server 108 via the internet, connection may fail for various reasons. The application may need to retry. Retries could happen in a row or apart from each other. To preserve battery capacity, if several retries fail, the system may discontinue retries for a predetermined time. This may be directed by the algorithm 106.

3) Variables that are used in the algorithm 106:

RTC (Real Time Clock) Timer: Will be set after first connect to the server 108

Current (Epoch) time: Will be set after first connect to the server 108

Designated upload (syncing) time: Set after first activation

Designated reading (record) time: Set after first activation

Last Alarm sent time: Set after first alarm occurs (Default 0)

The term "interval" is used instead of "designated time" because it is the datalogger device 102 and application 104 that calculate the next designated time. An operator may merely provide the interval. In another configuration, it may be possible to define designated times in 24 hours. There may be more than one retry cycle. If after a predetermined number of retries the application 104 is still failing to connect to the server 108, the application 104 may go to sleep and wait for the next recording (not uploading time) and will try again in the next cycle.

In an example, the recording interval is five minutes and uploading interval is twelve hours. If the application 104 fails to connect it will try again three times in a row. If the application 104 still fails it may attempt to connect five minutes later (again three times) and five minutes later for N times. After the Nth time, the application 104 assumes something is wrong with either the connection or with the server 108. The application 104 does not retry again before the next designated upload time if it is an ordinary condition or after M minutes (which is shorten upload interval in an emergency state).

Alarm repeat interval is another name for shorten upload interval in emergency state. The erase memory margin is to prevent unnecessary wearing of the memory. EEPROMs are rewritable like SD cards but the number of rewrites is limited, for example 10,000 times.

Figure 2A:
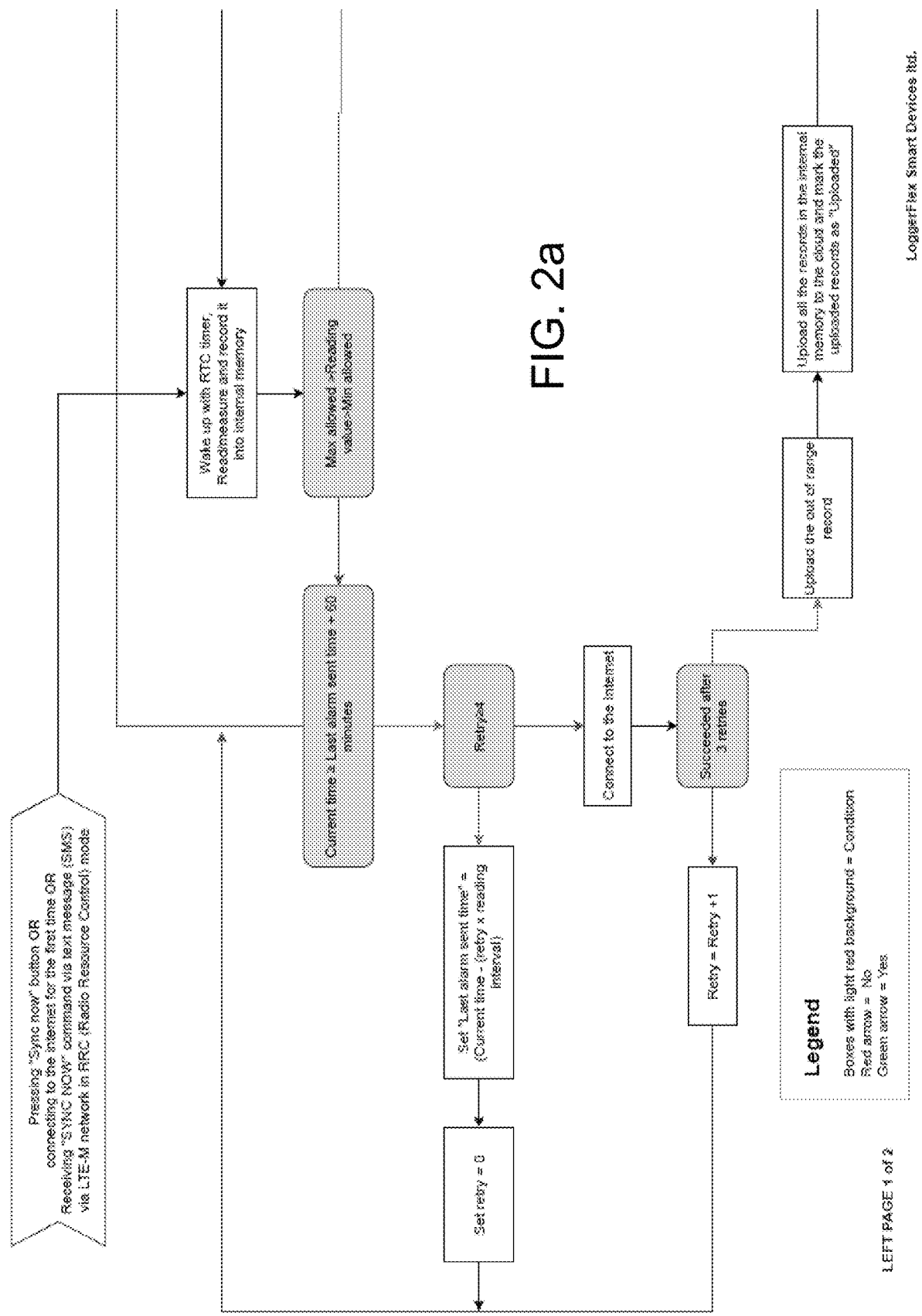
FIG. 2a and FIG. 2b is a flowchart of an algorithm provided by the system reducing energy consumption of datalogger devices while maintaining high sampling rate and real time alarm function according to an embodiment of the present disclosure.
Figure 2B:
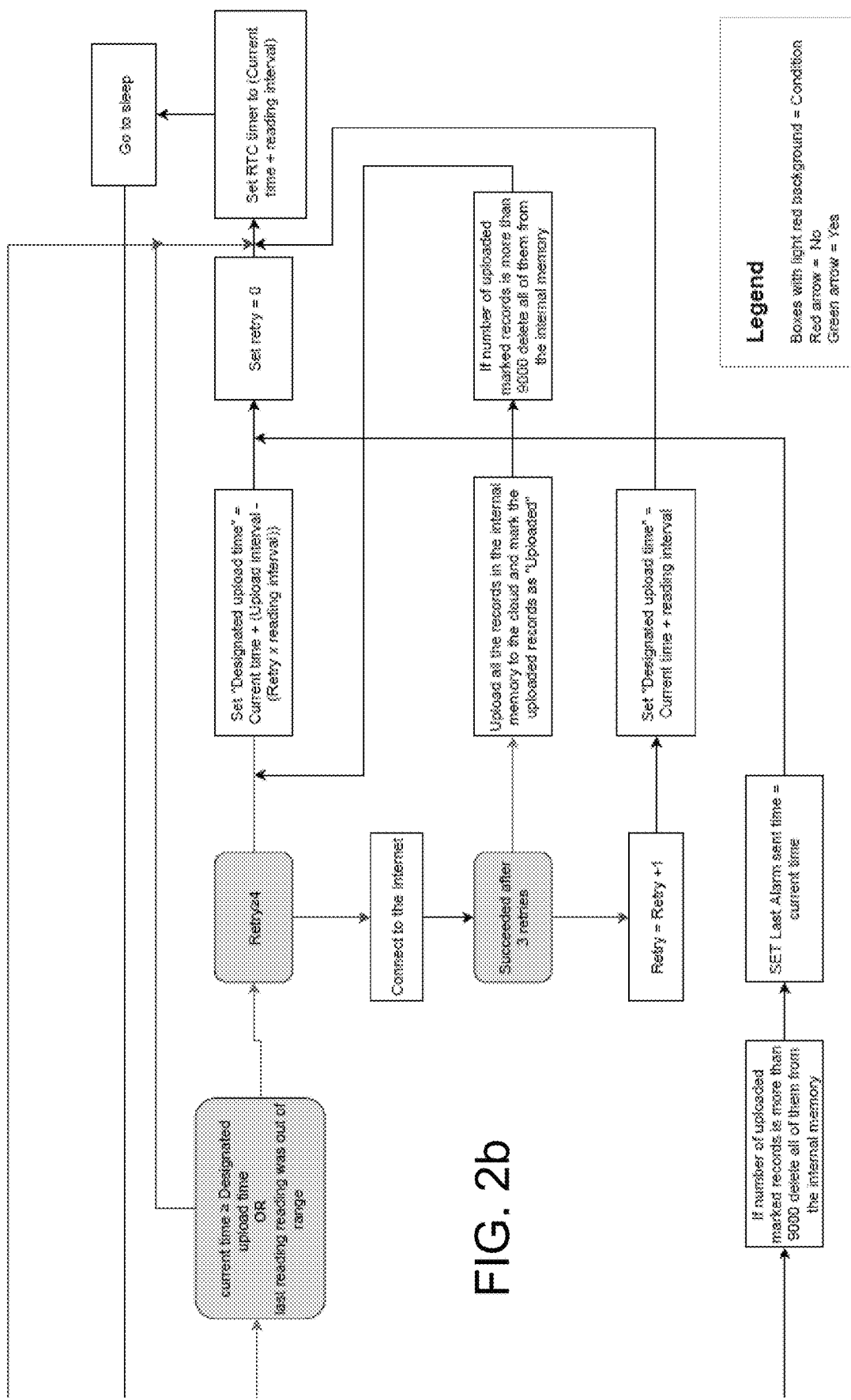

FIG. 2*a* and FIG. 2*b* viewed together provide a flowchart of the algorithm 106. They would be viewed on a side-by-side basis and illustrate how the algorithm arrives at recommendations for changes in sampling interval and updating interval.

In an embodiment, a system for reducing energy consumption of datalogger devices while maintaining high sampling rate and real time alarm function is provided. The system comprises a datalogger device, an algorithm stored in the datalogger device, and an application stored in the datalogger device that when executed implements a regular high sampling interval and extended server update interval for non-emergency situations and based on detection of an alarm, implements an emergency state. Based on the implementation, the application sends an immediate alert to the server, maintains the high sampling rate, shortens update interval in accordance with at least algorithm processing of inputs, continues updating on the shortened interval based at least on continued algorithm processing, determines, based on at least one change in alarm activity, to exit the emergency state, and returns to the extended update interval.

The server makes determinations regarding forwarding alerts to a client device. The datalogger receives alarm limits during syncing with the server to make local decisions for upload based on the alarm limits. The implemented regular high sampling rate for non-emergency situations is once per minute and the extended server update interval for non-emergency situations is once every twenty-four hours and wherein both the sampling rate and the update interval are configurable and reconfigurable. The algorithm directs multiple adjustments of the updating interval over the course of an abnormal condition wherein alarm characteristics change multiple times. The application implements changes to the updating interval based at least on output of the algorithm and further implements the changes based on instructions received from the server. Actions of the algorithm in implementing changes during alarm conditions are directed to at least conserving battery capacity of the datalogger device. During transmission of updates, if several retries fail, the system discontinues retries for a predetermined period.

In another embodiment, a system for conserving battery capacity of datalogger devices while maintaining responsiveness is provided. The system comprises a datalogger device configured to receive samples at a first sampling interval and configured to transmit updates at a first updating interval. The system also comprises an algorithm executing at least on the datalogger device that receives information describing a first received sample, the sample including a first alarm characteristic, directs adjustment of the first updating interval to a second updating interval based at least on the first alarm characteristic, receives information describing a second received sample, the second sample including a second alarm characteristic, and directs adjustment of the second updating interval to the first updating interval.

The first and second alarm characteristics comprise at least alarm frequency. The first alarm characteristic indicates an abnormal condition for an observed device. The second alarm characteristic indicates return to a normal condition for the observed device. The datalogger device transmits updates to a server. Tn application executing on the datalogger device furnishes the information to the algorithm. The algorithm directs multiple adjustments of the updating interval over the course of an abnormal condition during which alarm characteristics change multiple times.

In yet another embodiment, a method for reducing energy consumption of datalogger devices while maintaining high sampling rate and real time alarm function is provided. The method comprises a datalogger device implementing a regular high sampling interval and implementing an extended server update interval for non-emergency situations. The method also comprises the device, based on detection of an alarm, implementing an emergency state comprising sending an immediate alert to the server, one of maintaining and shortening the high sampling rate, shortening the update interval in accordance with processing of inputs, continuing transmission of updates based on the shortened interval, the continued transmission of updates based at least on continued processing of the inputs, determining, based on at least one change in alarm activity, to exit the emergency state, and returning to the extended update interval.

The method also comprises an application executing on the datalogger device providing inputs to an algorithm that performs the processing, the inputs comprising at least one of alarm thresholds, designated upload time, designated reading time, and last alarm sent time.

The method also comprises the algorithm receiving instructions from the server regarding alarm limits and changes to sampling interval and changes to the updating interval, the changes in addition to unilateral changes to sampling interval and updating interval directed by the algorithm.

The method also comprises the datalogger device, when transmitting via Long Term Evolution for Machines (LTE-M) technology and when using battery with no access to power, checking for incoming SMS (text message) commands using eDRX (Extended Discontinuous Reception) technology in short (seconds or minutes apart) intervals.

The checking for SMS messaging, which is used in at least GPS coordinate dataloggers, is executed via activation of an UPLOAD NOW mechanism, thereby overriding configured settings, forcing the datalogger device to update immediately, and not wait for designated update time.

What is claimed is:

1. A system for reducing energy consumption of datalogger devices while maintaining high sampling rate and real time alarm function, comprising:
   a datalogger device;
   an algorithm stored in the datalogger device; and
   an application stored in the datalogger device that when executed:
      implements a regular high sampling interval and extended server update interval for non-emergency situations,
      based on detection of an alarm, implements an emergency state:
         sends an immediate alert to the server,
         maintains the high sampling rate,
         shortens update interval in accordance with at least algorithm processing of inputs,
         continues updating on the shortened interval based at least on continued algorithm processing,
         determines, based on at least one change in alarm activity, to exit the emergency state, and
         returns to the extended update interval,
   wherein the datalogger device stores records of samples with timestamps for each sample for 24-hour sampling periods and uploads the stored records and timestamps at the end of each 24-hour sampling period to the server.

2. The system of claim 1, wherein the server makes determinations regarding forwarding alerts to a client device.

3. The system of claim 1, wherein the datalogger receives alarm limits during syncing with the server to make local decisions for upload based on the alarm limits.

4. The system of claim 1, wherein the implemented regular high sampling rate for non-emergency situations is once per minute and the extended server update interval for non-emergency situations is once every twenty-four hours and wherein both the sampling rate and the update interval are configurable and reconfigurable.

5. The system of claim 1, wherein the algorithm directs multiple adjustments of the updating interval over the course of an abnormal condition wherein alarm characteristics change multiple times.

6. The system of claim 1, wherein the application implements changes to the updating interval based at least on output of the algorithm and further implements the changes based on instructions received from the server.

7. The system of claim 1, wherein actions of the algorithm in implementing changes during alarm conditions are directed to at least conserving battery capacity of the datalogger device.

8. The system of claim 7, where during transmission of updates, if several retries fail, the system discontinues retries for a predetermined period.

9. A system for conserving battery capacity of datalogger devices while maintaining responsiveness, comprising:
   a datalogger device configured to receive samples at a first sampling interval and configured to transmit updates at a first updating interval; and
   an algorithm executing at least on the datalogger device that:
      receives information describing a first received sample, the sample including a first alarm characteristic,
      directs adjustment of the first updating interval to a second updating interval based at least on the first alarm characteristic,
      receives information describing a second received sample, the second sample including a second alarm characteristic, and
      directs adjustment of the second updating interval to the first updating interval;
   wherein the datalogger device stores records of samples with timestamps for each sample for 24-hour sampling periods and uploads the stored records and timestamps at the end of each 24-hour sampling period to a server.

10. The system of claim 9, wherein the first and second alarm characteristics comprise at least alarm frequency.

11. The system of claim 9, wherein the first alarm characteristic indicates an abnormal condition for an observed device.

12. The system of claim 11, wherein the second alarm characteristic indicates return to a normal condition for the observed device.

13. The system of claim 9, wherein during transmission of updates, if several retries fail, the system discontinues retries for a predetermined period.

14. The system of claim 9, wherein an application executing on the datalogger device furnishes the information to the algorithm.

15. The system of claim 9, wherein the algorithm directs multiple adjustments of the updating interval over the course of an abnormal condition during which alarm characteristics change multiple times.

16. A method for reducing energy consumption of datalogger devices while maintaining high sampling rate and real time alarm function, comprising:
   a datalogger device implementing a regular high sampling interval and implementing an extended server update interval for non-emergency situations, the device, based on detection of an alarm, implementing an emergency state comprising: sending an immediate alert to the server,
one of maintaining and shortening the high sampling rate,
shortening the update interval in accordance with processing of inputs,
continuing transmission of updates based on the shortened interval, the continued transmission of updates based at least on continued processing of the inputs,
determining, based on at least one change in alarm activity, to exit the emergency state, and
returning to the extended update interval,
further comprising the datalogger device storing records of samples with timestamps for each sample for 24-hour sampling periods and uploads the stored records and timestamps at the end of each 24-hour sampling period to the server.

17. The method of claim 16, further comprising an application executing on the datalogger device providing inputs to an algorithm that performs the processing, the inputs comprising at least one of alarm thresholds, designated upload time, designated reading time, and last alarm sent time.

18. The method of claim 17, further comprising the algorithm receiving instructions from the server regarding alarm limits and changes to sampling interval and changes to the updating interval, the changes in addition to unilateral changes to sampling interval and updating interval directed by the algorithm.

19. The method of claim 16, further comprising the datalogger device, when transmitting via Long Term Evolution for Machines (LTE-M) technology and when using battery with no access to power, checking for incoming SMS (text message) commands using eDRX (Extended Discontinuous Reception) technology in short (seconds or minutes apart) intervals.

20. The method of claim 19, wherein the checking for SMS messaging, which is used in at least GPS coordinate dataloggers, is executed via activation of an UPLOAD NOW mechanism, thereby overriding configured settings, forcing the datalogger device to update immediately, and not wait for designated update time.

* * * * *